(12) United States Patent
Thacher et al.

(10) Patent No.: US 8,031,086 B2
(45) Date of Patent: Oct. 4, 2011

(54) METHOD AND SYSTEM FOR DETERMINING A POSITION OF A VEHICLE

(75) Inventors: Russell James Thacher, Fort Mill, SC (US); Stewart J. Moorehead, Coal Valley, IL (US); Monte Andre Dickson, Charlotte, NC (US); John Michael Flenniken, Rock Hill, SC (US)

(73) Assignee: Deere & Company, Moline, IL (US)

( * ) Notice: Subject to any disclaimer, the term of this patent is extended or adjusted under 35 U.S.C. 154(b) by 343 days.

(21) Appl. No.: 12/331,636

(22) Filed: Dec. 10, 2008

(65) Prior Publication Data

US 2010/0141483 A1    Jun. 10, 2010

(51) Int. Cl.
*G08G 1/123* (2006.01)
(52) U.S. Cl. .......................................... 340/989; 701/23
(58) Field of Classification Search .................. 340/985, 340/988, 572.1, 572.7, 539.13, 989; 701/1, 701/23; 235/375
See application file for complete search history.

(56) References Cited

U.S. PATENT DOCUMENTS

| | | | |
|---|---|---|---|
| 4,847,773 A | 7/1989 | van Helsdingen et al. | |
| 5,684,476 A | 11/1997 | Anderson | |
| 5,999,866 A | 12/1999 | Kelly et al. | |
| 6,049,745 A * | 4/2000 | Douglas et al. | 701/23 |
| 6,134,493 A | 10/2000 | Kaneko | |
| 6,240,342 B1 | 5/2001 | Fiegert et al. | |
| 6,255,793 B1 | 7/2001 | Peless et al. | |
| 6,377,888 B1 * | 4/2002 | Olch | 701/207 |
| 6,417,641 B2 | 7/2002 | Peless et al. | |
| 6,453,223 B1 | 9/2002 | Kelly et al. | |
| 7,319,397 B2 * | 1/2008 | Chung et al. | 340/572.4 |
| 7,605,688 B1 * | 10/2009 | Seah | 340/425.5 |
| 2002/0104013 A1 | 8/2002 | Ghazarian | |
| 2005/0246094 A1 | 11/2005 | Moscatiello | |
| 2009/0212103 A1 * | 8/2009 | Li et al. | 235/375 |

FOREIGN PATENT DOCUMENTS

DE    102006004938    8/2007

OTHER PUBLICATIONS

Active RFID: Selecting the Optimal Frequency for Global Applications. A White Paper by Savi Technology. [online], Feb. 2002. Retrieved from the Internet: <URL:http://web.archive.org/web/20030702064045/http://www.savi.com/solutions/whitepapers/active_rfid.pdf>.

Patch, Kimberly. Radio tags give guidance. Technology Research News [online], Sep. 24/Oct. 1, 2003. [retrieved on Dec. 9, 2006]. Retrieved from the Internet:<URL://www.trnmag.com/Stories/2003/092403/Radis_tags_give_guidance_0923403.html>.

(Continued)

*Primary Examiner* — John A Tweel, Jr.

(57) ABSTRACT

Radio frequency identification tags are spaced apart from one another in or around a work area for the vehicle. Each of the tags has a corresponding unique identifier. A path planning module establishes a path comprising a path segment between at least two of the radio frequency identification tags. The path segment comprises at least one of a distance between the tags, an angular heading between the tags, and unique identifiers corresponding to the tags. A data processor determines an estimated position of the vehicle based on at least one of odometer data and accelerometer data. A vehicle controller navigates between at least two of the radio frequency identification tags based on the estimated position, the distance and the angular heading. A reader reads the tag identifiers of each tag to track the progress of the vehicle to facilitate execution of or retrieval of any next path segment of the vehicle along the established path.

16 Claims, 12 Drawing Sheets

OTHER PUBLICATIONS

IDmicro Product Profile. 2100-B/C Readers. [online]Retrieved from the Internet:<URL:https://www.idmicro.com/pdf/2100_BC_Readers.pdf>.

TagMaster Product Catalogue 2006/2007. [online]Retrieved from the Internet:<URL:http://www.tagmaster.com/download/brochures/Brouchure_Product_Catalogue_2006_HDseries.pdf>.

* cited by examiner

S100 — POSITION A GROUP OF RADIO FREQUENCY IDENTIFICATION TAGS OR MARKERS SPACED APART FROM ONE ANOTHER IN OR AROUND A WORK AREA FOR A VEHICLE. EACH OF THE TAGS HAS A CORRESPONDING UNIQUE IDENTIFIER.

S102 — ESTABLISH A PATH COMPRISING A PATH SEGMENT BETWEEN AT LEAST TWO OF THE RADIO FREQUENCY IDENTIFICATION TAGS. THE PATH SEGMENT MAY BE DEFINED BY ONE OR MORE OF THE FOLLOWING: A DISTANCE BETWEEN THE TAGS, AN ANGULAR HEADING BETWEEN THE TAGS, TAG COORDINATES, AND UNIQUE IDENTIFIES CORRESPONDING TO THE TAGS.

S104 — DETERMINE AN ESTIMATED POSITION OF THE VEHICLE BASED ON AT LEAST ONE OF ODOMETER POSITION DATA AND INERTIAL DATA.

S106 — NAVIGATE BETWEEN AT LEAST TWO OF THE RADIO FREQUENCY IDENTIFICATION TAGS BASED ON AT LEAST ONE OF THE ESTIMATED POSITION, THE DISTANCE AND THE ANGULAR HEADING.

S108 — READ THE TAG IDENTIFIER OF EACH TAG TO TRACK THE PROGRESS OF THE VEHICLE TO FACILITATE RETRIEVAL OR EXECUTION OF ANY NEXT PATH SEGMENT OF THE VEHICLE ALONG THE ESTABLISHED PATH.

S116 — VERIFY A POSITION OF THE VEHICLE BASED ON A DETECTED CONSTELLATION OF MULTIPLE RADIO FREQUENCY TAGS UNIQUE TO A PARTICULAR LOCATION WITHIN A WORK AREA CONSISTENT WITH A REFERENCE CONSTELLATION OF RECEIVABLE RADIO FREQUENCY IDENTIFICATION TAGS.

METHOD AND SYSTEM FOR DETERMINING A POSITION OF A VEHICLE

FIELD OF THE INVENTION

This invention relates to a method and system for determining a position of a robotic vehicle.

BACKGROUND

In the prior art, a boundary of a work area may be defined by a buried wire, a cable, or conductor associated with an applied current (e.g., an alternating current). A vehicle for operation in the work area is equipped with a magnetic field detector or an electric field detector for detecting the magnetic or electric field generated by the boundary wire, cable, or conductor. If a magnetic or electric field is detected, a vehicle controller may instruct the vehicle to change its course to some random path within the work area. However, if the vehicle is a mower, sprayer, or other device that is designed to cover all or a substantial portion of the work area, the execution of such random paths tends to be slow and energy inefficient. Thus, there is a need for an alternative method and system for determining the position of the vehicle.

SUMMARY OF THE INVENTION

In accordance with one embodiment, a method and system for determining the position of a vehicle (e.g., a robotic vehicle) comprises positioning a group of radio frequency identification tags spaced apart from one another in or around a work area for the vehicle. Each of the tags has a corresponding unique tag identifier. A path planning module establishes a path comprising a path segment between at least two of the radio frequency identification tags. For example, the path segment may comprise one or more of the following: a distance between the tags, an angular heading between the tags, and unique tag identifiers corresponding to the tags. A data processor determines an estimated position of the vehicle based on at least one of odometer data and inertial sensor data. A vehicle controller navigates between at least two of the radio frequency identification tags based on the estimated position, the distance and the angular heading. A reader reads the tag identifiers of one or more tags to track the progress of the vehicle to facilitate execution or retrieval of any next path segment of the vehicle along the established path.

DESCRIPTION OF THE PREFERRED EMBODIMENT

Figure 1:
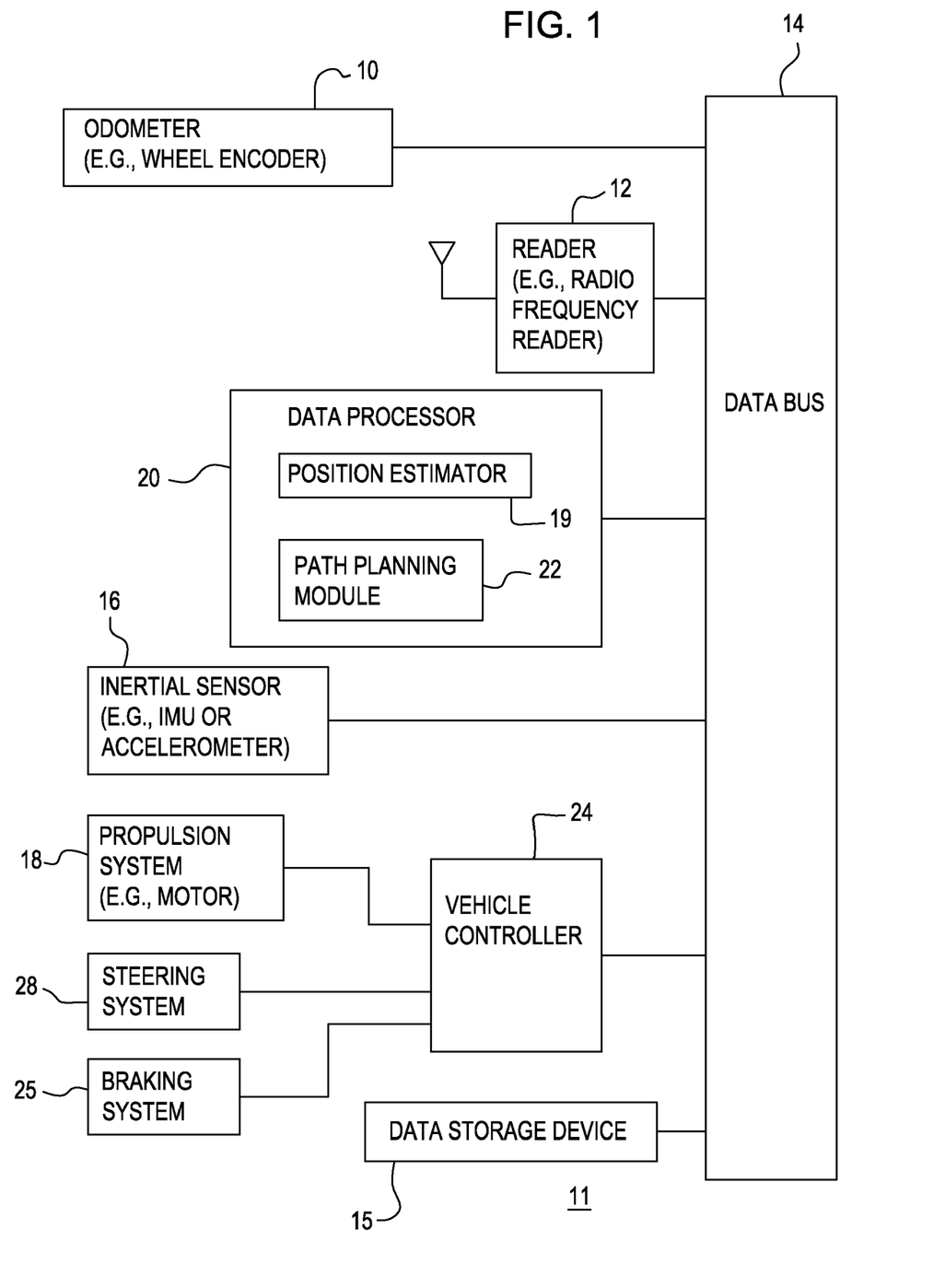
FIG. 1 is a block diagram of a first embodiment of a system for determining a position of the vehicle.

In FIG. 1, in accordance with one embodiment, a system 11 for determining position of a vehicle comprises an odometer 10, a reader 12, and an inertial sensor 16 that are capable of communicating sensor data to a data processor 20 via a data bus 14. Sensor data includes one or more of the following: odometer data, radio frequency identification tag data, and inertial data (e.g., accelerometer data). Inertial data is synonymous with inertial sensor data. The data processor 20 may communicate with a data storage device 15 and a vehicle controller 24, directly or indirectly through the data bus 14 as shown in FIG. 1. The vehicle controller 24 is coupled to a propulsion system 18, a braking system 25 and a steering system 28. The communication lines or paths interconnecting the vehicle controller 24 to the propulsion system 18, the braking system 25, and a steering system 28 may be routed through or connected to one another via a secondary data bus (not shown).

As illustrated in FIG. 1, the odometer 10, the reader 12 and the inertial sensor 16 are coupled to the data bus 14. The odometer 10 may comprise a wheel encoder or another device for measuring the distance that the vehicle or vehicle travels over the ground or other surface. For example, the odometer 10 may comprise a stationary magnetic sensor (e.g., Hall Effect sensor or magnetic field sensor) that measures the revolutions of a magnet mounted to a wheel, hub or rotor. The stationary magnetic sensor, alone or in conjunction with a data processor or a comparator, may detect at least one or more of the following: (1) a magnitude of a magnetic field associated with the rotating magnet, (2) the direction of a magnetic field associated with a rotating magnet, (3) whether the detected magnitude of a magnetic field exceeds a minimum threshold, and (4) a number of threshold exceeding excursions of the magnetic field per unit time.

The inertial sensor 16 comprises an accelerometer, a gyroscope, an inertial measurement unit (IMU), or another device for measuring the magnitude and direction of motion (e.g., acceleration, velocity or both) associated with the vehicle. For example, an inertial measurement unit (as the inertial sensor) may detect the roll, pitch and yaw of the vehicle. The roll measures lateral tilt of the vehicle, where one side of the vehicle is higher or lower than the other side. Pitch measures frontward or backward tilt of the vehicle, where the front or nose of the vehicle points upward or downward from a neutral or level state. Yaw measures a heading of the vehicle or the extent that the vehicle front or nose points to the left or right of a straight or neutral course or heading. The roll, pitch and yaw may be expressed as angles or angular displacements versus time to describe the motion of the vehicle.

The reader 12 may comprise a radio frequency reader 12 that reads radio frequency identification tags (RFID's). In one embodiment, the reader 12 may comprise a receiver that is capable of receiving a radio frequency signal transmitted by an active radio frequency identification tag or a return signal induced in a passive radio frequency identification tag. In another embodiment, the reader 12 may comprise a transceiver or a combination of a transmitter and a receiver, where the transmitter transmits an interrogation signal to a radio frequency identification tag and where the receiver receives a reply signal from the radio frequency identification tag (e.g., active or passive radio frequency identification tag). The reader 12 may be mounted in a known reference position on the vehicle (e.g., at a center point between the wheels with respect to the track, width, wheelbase, or swath of the vehicle).

An active radio frequency identification tag comprises a transmitter for generating a reply signal or transmitting a beacon signal, whereas the passive radio frequency identification tag may comprise a tuned circuit or coil that is activated or excited in response to the receipt of a certain triggering signal. Each radio frequency identification tag is assigned a unique tag identifier and is associated with or placed at a fixed, known location in or around the work area. In an alternate embodiment, a ferrous metal member is co-located with each radio frequency identification tag to provide a supplemental basis for verification of the fine or exact position of the vehicle within the work area.

In FIG. 1, the data processor 20 comprises a position estimator 19 that uses sensor data from one or more of the following sensors: the odometer 10, the inertial sensor 16, and the reader 12 to estimate at least a position of the vehicle. The position estimator 19 may also estimate one or more of the following: a heading, velocity, acceleration, pitch angle, roll angle, or yaw angle. The odometer 10 data may provide a raw estimate of the position of the vehicle, where the data processor 20 may use the inertial data, the radio frequency identification tag data (e.g., or a known location associated with a corresponding tag identifier), or both to determine a refined or corrected estimate of the position of the vehicle.

For example, the data processor 20 or position estimator 19 may use the inertial data in conjunction with the odometer data to correct the raw estimate of the vehicle position because of any of the following conditions: (a) spinning or slippage of one or more wheels (or tracks) of the vehicle with respect to the ground, and (b) locking up or ceased rotation of one or more wheels (or tracks) with respect to the ground where the vehicle is in motion. In one possible scenario, if the wheel rotates and slips or spins with respect to the ground, the propulsion system 18 imparts less than full acceleration to move the vehicle and the data processor 20 may detect a discrepancy between the odometer data and the inertial data. Here, the discrepancy between the odometer data and the inertial data is such that the odometer 10 data overestimates that distance traveled by the vehicle. The data processor 20 may disregard the slipping wheel rotation, wholly or partially, or otherwise to estimate a corrected position of the vehicle. For instance, the data processor 20 may disregard the odometer data and use the inertial data to estimate a corrected position of the vehicle. Alternately, the data processor 20 may estimate a corrected position of the vehicle based on the inertial data.

In another possible scenario, if a wheel is locked up such that it does not rotate and the odometer 10 data does not indicate rotation of the wheel, the data processor 20 may underestimate the distance traveled by the vehicle. For instance, the vehicle may be slipping down a slope or skidding to a stop where normal wheel rotation is reduced or impeded. Here, the data processor 20 may detect a discrepancy between the odometer data and the inertial data, where the inertial data indicates the vehicle is in motion and the odometer data does not. Accordingly, the data processor 20 may disregard the odometer data and use the inertial data to estimate a corrected position of the vehicle. Alternately, the position estimator or data processor 70 may decrease a weight assigned to the odometer data relative to a second weight assigned to the inertial data.

The data processor 20 may comprise a position estimator 19 and a path planning module 22. In one embodiment, the position estimator 19 estimates a vehicle position of the vehicle based on the odometer data, the inertial data, and the radio frequency identification data. The odometer data may be expressed as a number of revolutions of a wheel of known radius or circumference, or the distance traveled by the wheel over ground, the number of revolutions per unit time, or the distance per unit time, or velocity. The inertial data means roll data, pitch data or yaw data, velocity data, acceleration data, or the like. The radio frequency (RF) identification tag data means a tag identifier, a corresponding location or position, a signal strength of the received signal from the tag, a signal quality of the received signal from the tag, or an acknowledgement or reply (e.g., code word or data message) received from the tag.

If the vehicle is co-located with or near a known location of a corresponding radio frequency identification tag, the data processor 20 may update or revise the estimated position of the vehicle based on the odometer data or the odometer data and inertial data to be consistent with the known location. In one embodiment, the data processor 20 or position estimator 19 may assign a first weight, a second weight, and a third weight to indicate the respective contributions of the odometer data, the inertial data, and radio frequency identification tag to the estimate or updated position of the vehicle.

The path planning module 22 may determine a path segment, a series of path segments or a path plan for coverage of a portion or an entire work area for the vehicle. In one embodiment, the path planning module 22 determines one or more of the following: (a) what portions or path segments of a path plan a vehicle has already traversed in the past, (b) what is the current position or status of the vehicle with respect to the path plan, and (c) what path segments of the path plan, the vehicle is planning or programmed to traverse in the future.

The vehicle controller 24 may receive path planning data from the path planning module 22 or the data processor 20. In response to the path planning data, the vehicle controller 24 may generate control data for the propulsion system 18, the steering system 28 and the braking system 25 to carry out the path plan.

The data processor 20 may store, retrieve or access stored data in the data storage device 15. The data storage device 15 may store reference information. For example, the data storage device 15 may store identifiers of radio frequency identification tags and corresponding positions, where the tag itself is not encoded with its position. The corresponding positions may be expressed in Cartesian coordinates or polar coordinates relative to a reference position associated with the work area. Alternatively, the corresponding positions may be expressed as absolute coordinates (e.g., longitude or latitude) relative to a real world reference position.

The vehicle controller 24 is coupled, directly or indirectly, to the propulsion system 18, the steering system 28 and the braking system 25 of the vehicle. The vehicle controller 24 is capable of generating control signals or control data to control the propulsion system 18, the steering system 28 and the braking system 25 of the vehicle.

For the propulsion system 18, the vehicle controller 24 may comprise an inverter, a chopper circuit, a variable voltage source, an oscillator, a variable current source, a direct current supply, an alternating current supply, or any data processing device for controlling a propulsion system 18. The vehicle controller 24 may further comprise a logic circuit, a data processing system or another device for generating an analog or digital control signal for the steering system 28 and braking system 25.

The propulsion system 18 may comprise an electric motor, an internal combustion engine, a hybrid propulsion system, or another device for propelling the vehicle. A hybrid propulsion system may comprise an internal combustion engine that provides rotational energy to an alternator or generator for charging an energy storage device (e.g., battery) coupled to one or more electric motors. The propulsion system 18 may be arranged to impart rotational energy from one or more wheels (or tracks) to the ground or another surface below the vehicle.

The steering system 28 may comprise an electrically controlled steering system, an electro-hydraulic steering system, a solenoid controlled steering system, or another system for changing the direction of one or more wheels of the vehicle. In an alternative embodiment, the steering system 28 may comprise a skid steering system 28 in which differential rotation rates are applied by the propulsion system 18 to different wheels to steer the vehicle.

The braking system 25 may comprise an electrically controlled braking system, an electro-hydraulic braking system, a solenoid braking system, or another system for stopping or decelerating the vehicle.

Figure 2:
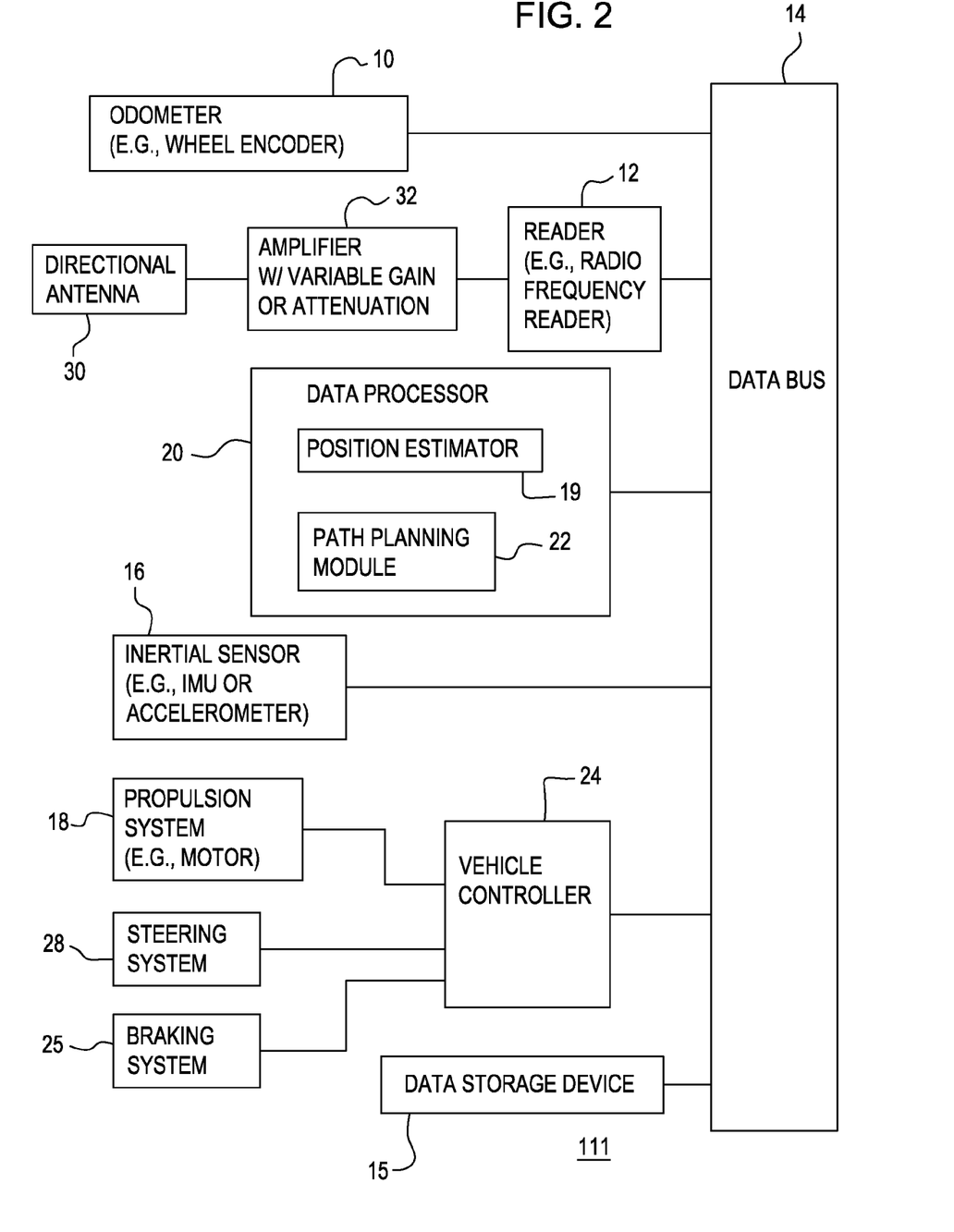
FIG. 2 is a block diagram of a second embodiment of a system for determining a position of the vehicle.

The position determination system 111 of FIG. 2 is similar to the system 11 of FIG. 1, except the system 111 of FIG. 2 further comprises a directional antenna 30 and an amplifier 32 coupled to the reader 12. The directional antenna 30 may have a radiation pattern that is limited to a defined angular range (e.g., approximately 30, 60 or 90 degrees at the half power points of the transmitted or received signal). The amplifier 32 may support variable gain or variable attenuation of the received signals from one or more radio frequency identification tags. In general, the directional antenna 30 will limit the reception to radio frequency identification tags within the defined angular range of the radiation pattern, for a given sensitivity of the reader 12 and amplification of the amplifier 32. The amplifier 32 may have variable gain, attenuation, or both that can be adjusted to increase or decrease the group or pool of radio frequency identification tags within the range of the directional antenna 30.

Figure 3:
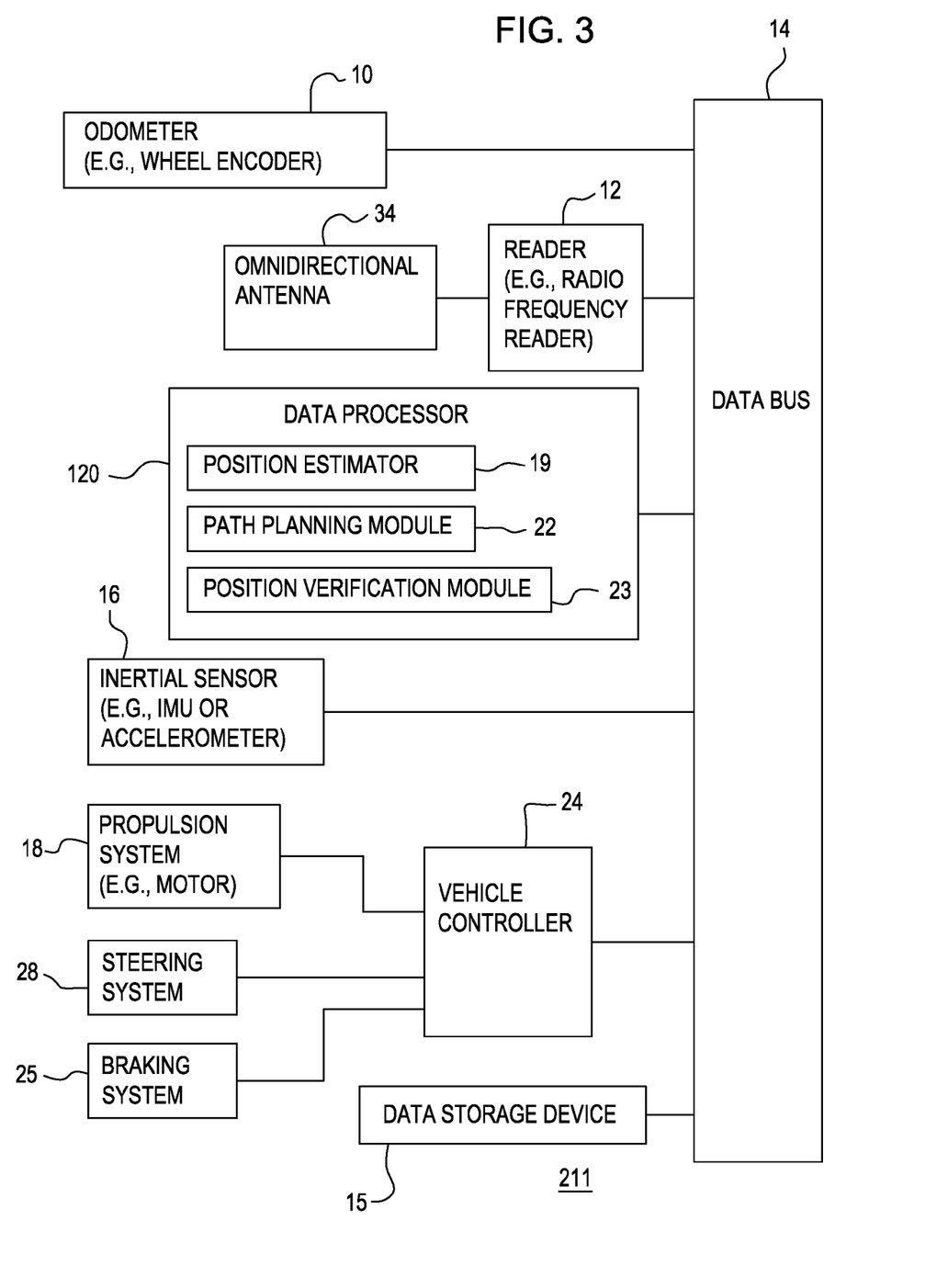
FIG. 3 is a block diagram of a third embodiment of a system for determining a position of the vehicle.

The position determination system 211 of FIG. 3 is similar to the system 11 of FIG. 1, except the system 211 of FIG. 3 further comprises a wide angle or a generally omni-directional antenna 34 and a position verification module 23. The wide angle or omni-directional antenna 34 has a radiation pattern that provides reception over a wide angular range (e.g., at least 120 degrees within the horizontal plane) in approximately 360 degrees within the horizontal plane. The position verification module 23 may receive multiple radio frequency identification tags because of the wide angle or omni-directional antenna 34. The received or observed identifiers associated with radio frequency identification tags are compared to reference identifiers of radio frequency identification tags.

In one embodiment, a reference constellation or group of reference identifiers are associated with corresponding positions or ranges of positions within the work area. The reference identifiers are stored in a data storage device 15. The position verification module 23 may match the observed identifiers to reference constellations or groups of reference identifiers. The position verification module 23 then retrieves the corresponding positions or range of positions (from the data storage device 15) as the estimated position or range of positions of the vehicle.

Figure 4:
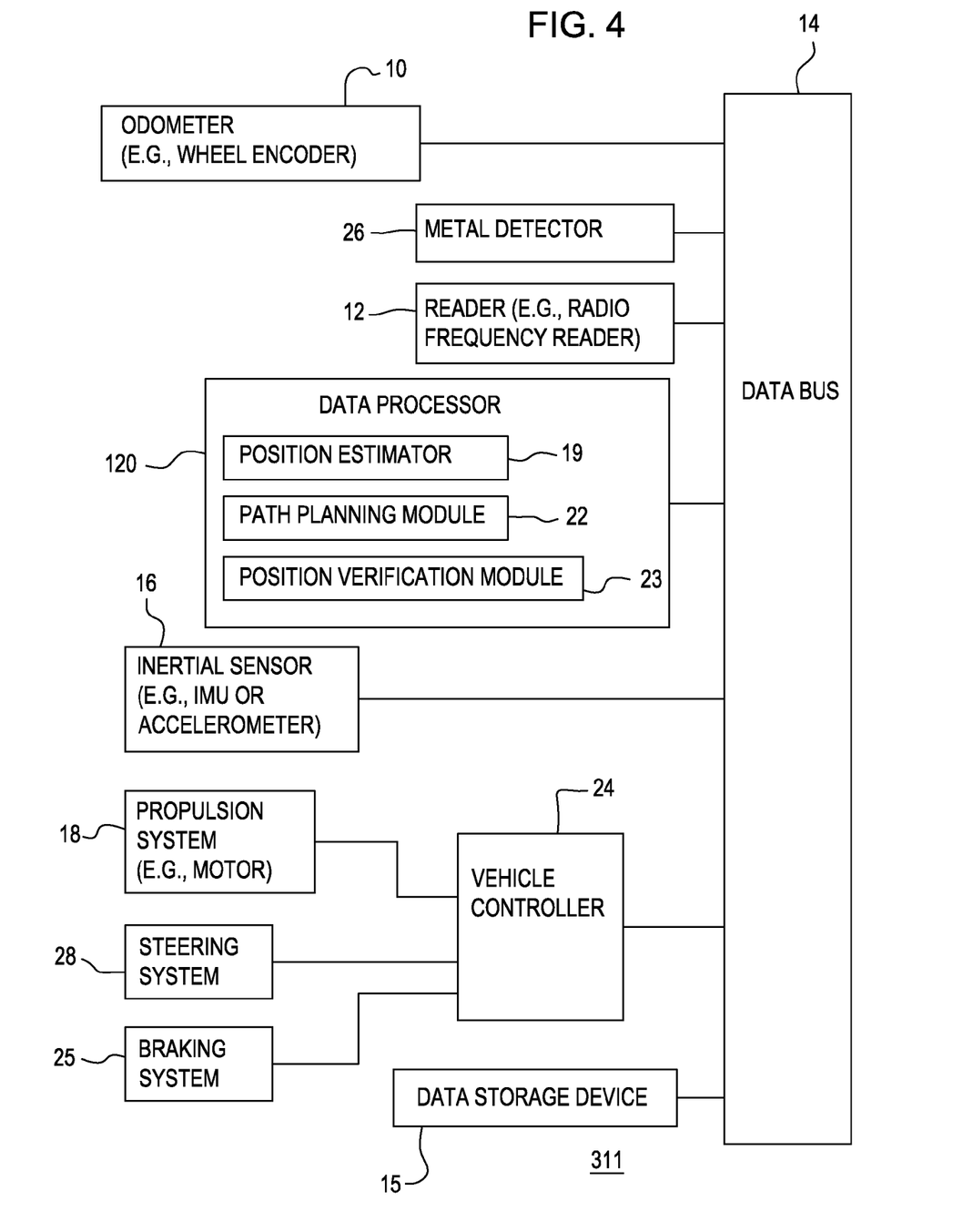
FIG. 4 is a block diagram of a fourth embodiment of a system for determining a position of the vehicle.

The position determination system 311 of FIG. 4 is similar to the system 11 of FIG. 1, except that system 311 of FIG. 4 further comprises a metal detector 26 and a position verification module 23. The metal detector 26 comprises a device for detecting nearby or proximate ferrous metals, ferrous alloys, alloys, or magnetic materials. In one embodiment, the metal detector 26 has an oscillator coupled to a transmitting coil and a magnetic field detector 26 (e.g., magnetometer) coupled to receiving coil. The oscillator comprises a signal generator that generates an alternating current signal for inducing a magnetic field in the transmitting coil. If a ferrous metal or alloy is adjacent to, near or proximate to the receiving coil, the magnetic field detector 26 may detect a change in the magnetic field associated with the ferrous metal or ferrous alloy marker. Ferrous metal markers or ferrous alloy markers may be fixed or positioned at known locations in the work area in preparation for use of the vehicle in the work area. For example, metal markers or alloy markers may be co-located with radio frequency identification tags. The position verification module 23 may verify an exact or fine position of the radio frequency tag identifier, and hence, the exact or fin position of the vehicle is located or pinpointed directly over the tag and the marker combination. The position verification module verifies the detector's detection or reception of the co-located marker that is co-located with the radio frequency identification tag. If the metal detector 26 does not detect a co-located marker, the position verification module 23 interprets the non-detection as the position of the vehicle that is actually some distance (e.g., possible a short distance, such that the vehicle is now located directly over the tag and marker combination) from the radio frequency identification tag. If the metal detector 26 or the receiving coil of the metal detector 26 passes directly over the metallic or alloy marker, the position verification module 23 interprets the detection such that the position of the marker and the co-located radio frequency identification tag are the verified position or estimated position of the vehicle.

In one embodiment, the data processor 120 or position verification module 23 may move the vehicle to search for one or more markers in accordance with a search pattern (e.g., a sinusoidal, curved or zigzag pattern). In an alternate embodiment, the odometer 10, the inertial sensor 16, or both may provide sufficient guidance information until the metal detector 26 or receiving coil of the vehicle happens to drive directly over a marker.

Figure 5:
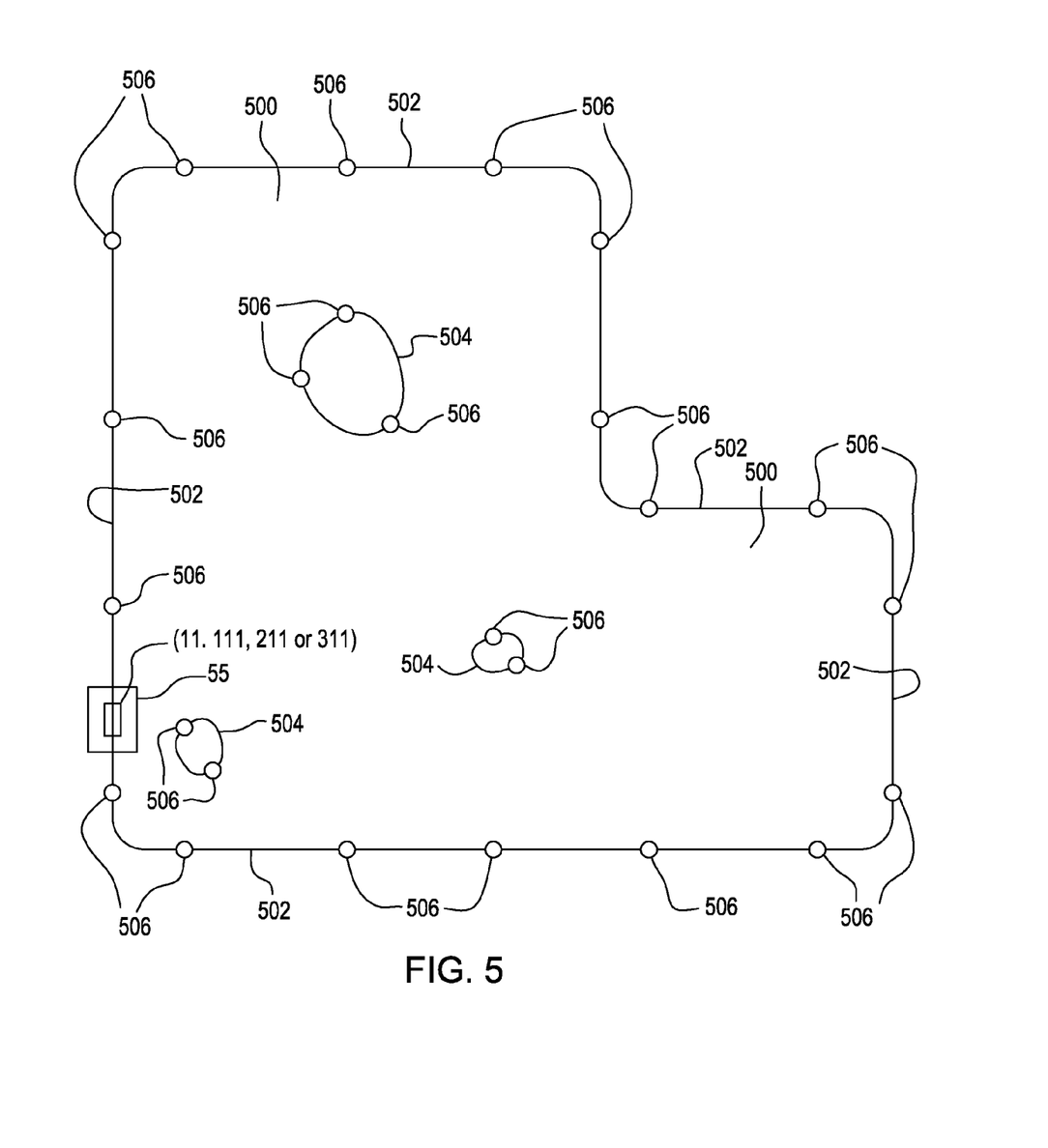
FIG. 5 is an illustrative configuration of a work area that is consistent with various embodiments of the method and system for determining a position of the vehicle.

FIG. 5 is a plan view of a first configuration of markers 506 associated with a work area 500. The vehicle 55 carries or contains any embodiment of the positioning system (11, 111, 211 or 311) previously referenced in FIG. 1 through FIG. 4. Markers 506 or radio frequency identification tags are placed around, on or near a boundary or an outer perimeter 502 of the work area 500 and around obstacles or internal areas 504 within the work area 500. The internal areas 504 may be defined as no-entry or keep-out areas for the vehicle 55. The markers 506 may comprise radio frequency identification tags connected or secured to stakes or otherwise placed in the ground at fixed positions. The stakes may be constructed from a metal, an alloy, a polymer, plastic, composite or fiber reinforced plastic or polymer. In one embodiment, the stakes are constructed from steel or another ferrous metal or alloy for possible detection by a metal detector 26 of FIG. 4.

In an alternative embodiment, markers 506 may comprise radio frequency identification tags that are co-located with a ferrous or ferrous alloy member.

As shown in FIG. 5, the radio frequency identification tags or markers 506 may be located at generally regular spacing intervals or at other spacing intervals, around the perimeter 502 or even within the work area 500. The markers 506 or radio frequency identification tags are at least located along the internal areas that are designated as keep-out areas for the vehicle 55 and the perimeter 502 of the work area 500. In one embodiment, the markers 506 or radio frequency tags may be offset inwardly from an outer boundary or an outer perimeter 502 of the work area by an offset width (e.g., a mowing swath width where the vehicle is a mower). The offset width may depend on one or more of the following: (a) alignment of the reader 12, or its antenna, within the width of the vehicle 55 and overlying the markers or radio frequency identification tags, or (b) alignment of the edge of the mowing or cutting swath width of a blade or cutter with the outer boundary or outer perimeter 502 of the work area, where the vehicle is a mower, cutter, harvester or combine. In a first example, the offset width may be determined such that an outer edge or width of the vehicle tracks substantially even with or in general alignment with the perimeter of the work area. In a second example, the offset width may be determined such that an outer edge or width of the vehicle is located entirely within the work area. In a third example, the offset width may be determined such that an outer edge or width of the vehicle is located to slightly overlap with the work area.

Figure 6:
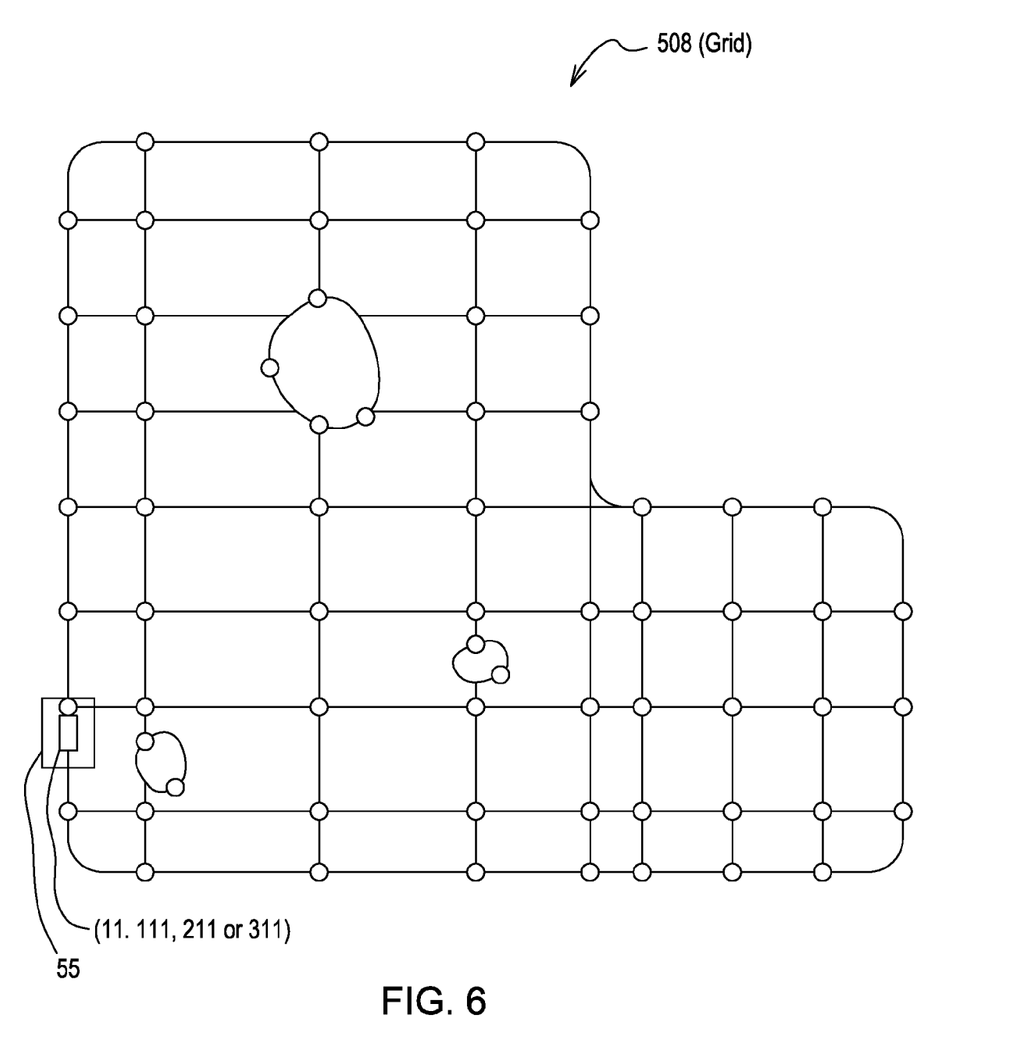
FIG. 6 is another illustrative configuration of a work area that is consistent with the method and system for determining a position of the vehicle.

FIG. 6 is a plan view of a second configuration of markers 506 associated with a work area 500. Like reference numbers in FIG. 5 and FIG. 6 indicate like elements.

In FIG. 6, radio frequency identification tags or markers 506 are placed around an outer perimeter area at known locations and within a grid 508 or at known locations in the interior of the work area. The grid may comprise an generally rectangular array or polygonal array of markers 506 or radio frequency identification tags that occupy an interior and extend to an outer boundary or perimeter of the work area. The known locations of the markers 506 may be defined in local coordinates, with reference to an origin or reference point, for example. The radio frequency identification tags or markers 506 are also positioned around obstacles or internal areas 504 (if any) within the work area. As the vehicle 55 traverses the grid 508 within the work area 500, each marker 506 that the vehicle passes over or proximate to can provide corrective information to adjust or refine the estimated position of the vehicle based on the odometer data, and the inertial sensor data, for example.

Figure 7:
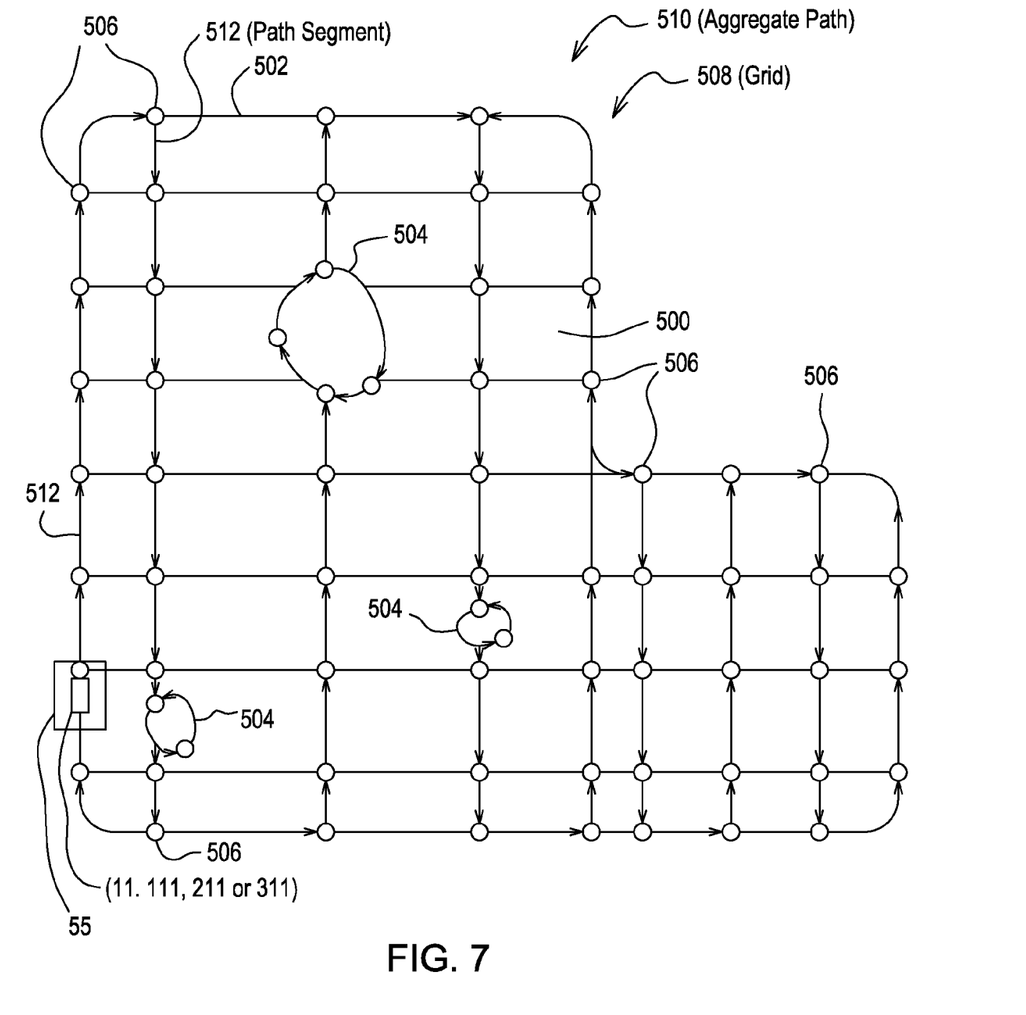
FIG. 7 illustrates a potential path plan or aggregate path of a vehicle within the work area of FIG. 6.

FIG. 7 illustrates a potential path plan or aggregate path 510 of the vehicle 55 to cover the work area 500 of FIG. 6 with the grid 508 of markers 506 (e.g., radio frequency identification tags or radio frequency identification tags and metal or alloy members). Like reference numbers in FIG. 6 and FIG. 7 indicate like elements.

In the illustrative example of FIG. 7, the vehicle 55 may need to cover or traverse the entire area of the work area 500 at least once to mow, harvest, or cut vegetation or to deliver or treat vegetation with water, fertilizer, pesticide, fungicide, herbicide, or another input for distribution on the vegetation or soil. For example, the path plan or aggregate path 510 may comprise a group of somewhat parallel rows or swathes, where the vehicle comprises a mower, a sprayer, a chemical distribution unit. The aggregate path 510 comprises a series of interconnected path segments 512. Each path segment 512 is shown as an arrow, beginning at a previous marker 506 and terminating at a subsequent marker 506. The aggregate path 510 shown in FIG. 7 is for illustrative purposes only and a number of other possibilities exist for potential aggregate paths and path segments within any aggregate path. The data processor 20 may note where paths overlap or where the vehicle traverses path segments 512 or portions of path segments 512 more than once to prevent excessive application of chemicals, water or other inputs for distribution on the vegetation or soil.

Figure 8:
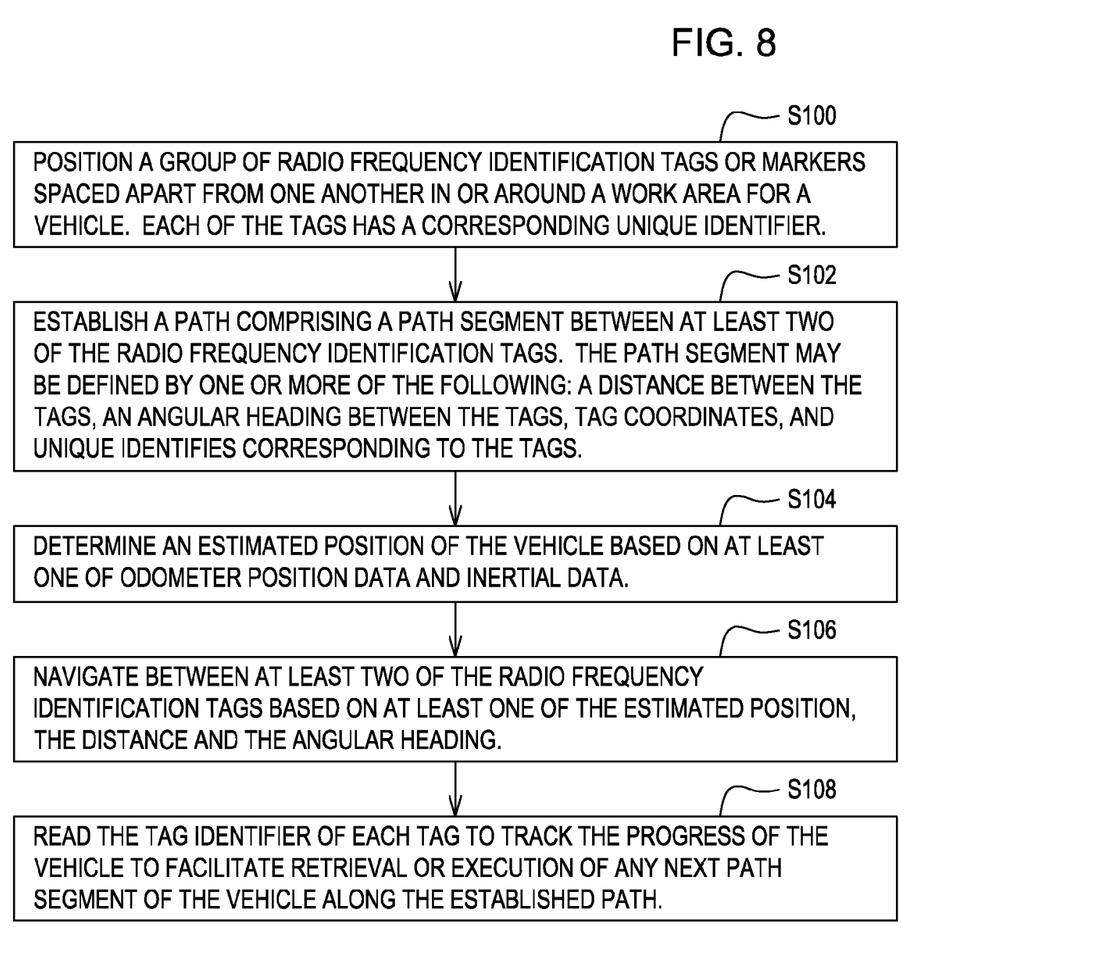
FIG. 8 is a flow chart of a first embodiment of a method for determining a position of the vehicle.

FIG. 8 illustrates a method for determining the position of a vehicle. The method of FIG. 1 begins in step S100.

In step S100, a user or installer positions a group of markers 506 or radio frequency identification tags spaced apart from one another in or around a work area (e.g., 500) for the robotic vehicle. Each of the tags (e.g., 506) has a corresponding unique identifier.

In step S102, a data processor 20 or a path planning module 22 establishes a path (e.g., aggregate path 510 in FIG. 7) comprising a path segment (e.g., 512 in FIG. 7) between at least two of the radio frequency identification tags or markers 506. The path segment may be defined by one or more of the following characteristics: a distance between the tags, an angular heading between the tags, unique identifiers corresponding to the tags, and coordinates of the tags. Further, the path segment may be assigned a path segment identifier to uniquely distinguish one path segment from another within a work area.

Step S102 may be carried out in accordance with various techniques that may be applied alternatively or cumulatively. Under a first technique, if a group of radio frequency identification tags or markers 506 are arranged as a grid within a work area, the data processor 20 or path planning module 22 may assign a path or series of path segments through the grid.

Under a second technique, the path comprises a virtual track for the vehicle in the work area, where the vehicle is prohibited from leaving the virtual track and entering other areas (e.g., internal restricted entry areas or zones containing obstacles, obstructions, hazards or impassable terrain) of the work area.

In step S104, a data processor 20 or position estimator 19 determines an estimated position of the vehicle based on at least one of odometer position data and inertial data (e.g., accelerometer data). If the starting position of the vehicle is known based on positioning of the vehicle at a known starting point or reference point, the odometer data provides an estimated elapsed distance from the starting point. The inertial data may supplement the odometer data to improve the accuracy of the estimated elapsed distance from the starting point, and to detect turns or changes in yaw angle or heading of the vehicle.

In step S106, a data processor 20 or vehicle controller 24 navigates the vehicle between at least two of the radio frequency identification tags or markers 506 based on the estimated position, the distance and the angular heading.

In step S108, a reader 12 reads the tag identifiers of each tag to track the progress to facilitate retrieval or execution of any next path segment of the vehicle along the established path. The path may comprise a virtual track for the vehicle in the work area, wherein the vehicle is prohibited from leaving the virtual track and entering other areas of the work area. For example, the path may be established as a series of path segments formed by interconnecting radio frequency identification tags arranged in a grid pattern within the work area and arranged around the boundary of the work area.

Figure 9:
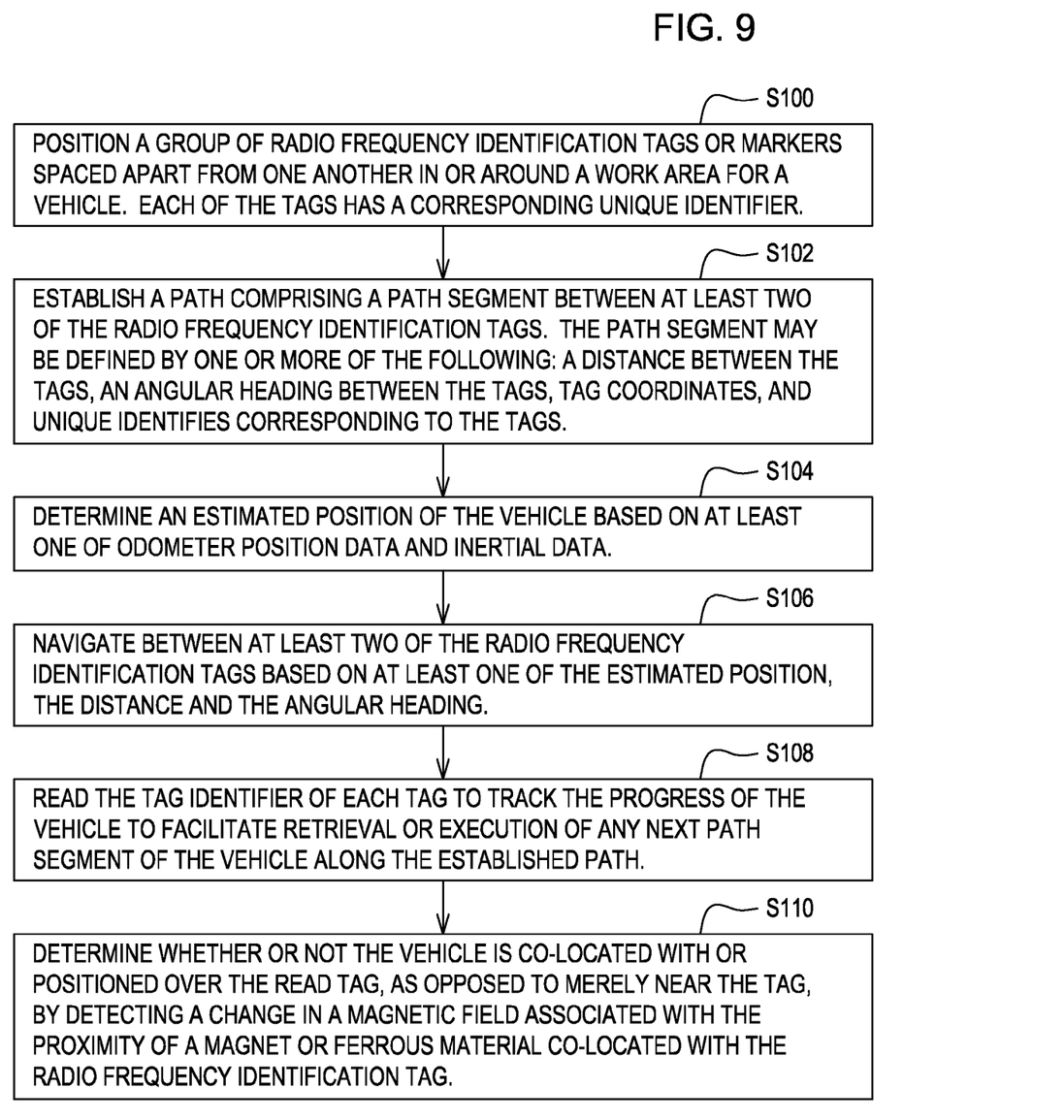
FIG. 9 is a flow chart of a second embodiment of a method for determining a position of the vehicle.

The method of FIG. 9 is similar to the method of FIG. 8, except the method of FIG. 9 further comprises step S110. Like reference numbers in FIG. 8 and FIG. 9 indicate like steps or procedures. Step S110 may follow step S108 or may be executed simultaneously with step S108.

In step S110, the position estimator 19 or data processor 120 determines whether or not the vehicle is co-located with or positioned over the read tag, as opposed to merely near the tag, by detecting a change in a magnetic field associated with the proximity of a ferrous material, ferrous alloy material, a permanent magnet or electromagnet magnet co-located with the radio frequency identification tag. The position estimator 19 or data processor 120 may work in conjunction with a metal detector 26 to detect the position of the vehicle such that the vehicular position is pinpointed as directly over the radio frequency identification tag and its co-located ferrous material, ferrous alloy or magnet. Accordingly, the method of FIG. 9 advantageously allows the positioning system 311 to discriminate between or identify a closest individual radio frequency identification tag to the vehicle, where the reader 12 simultaneously receives multiple radio frequency identification tags. The positioning system 311 is capable of reliably resolving the ambiguity between potential locations of the vehicle associated with multiple radio frequency identification tags that are capable of being received by the reader 12 at any given time.

Figure 10:
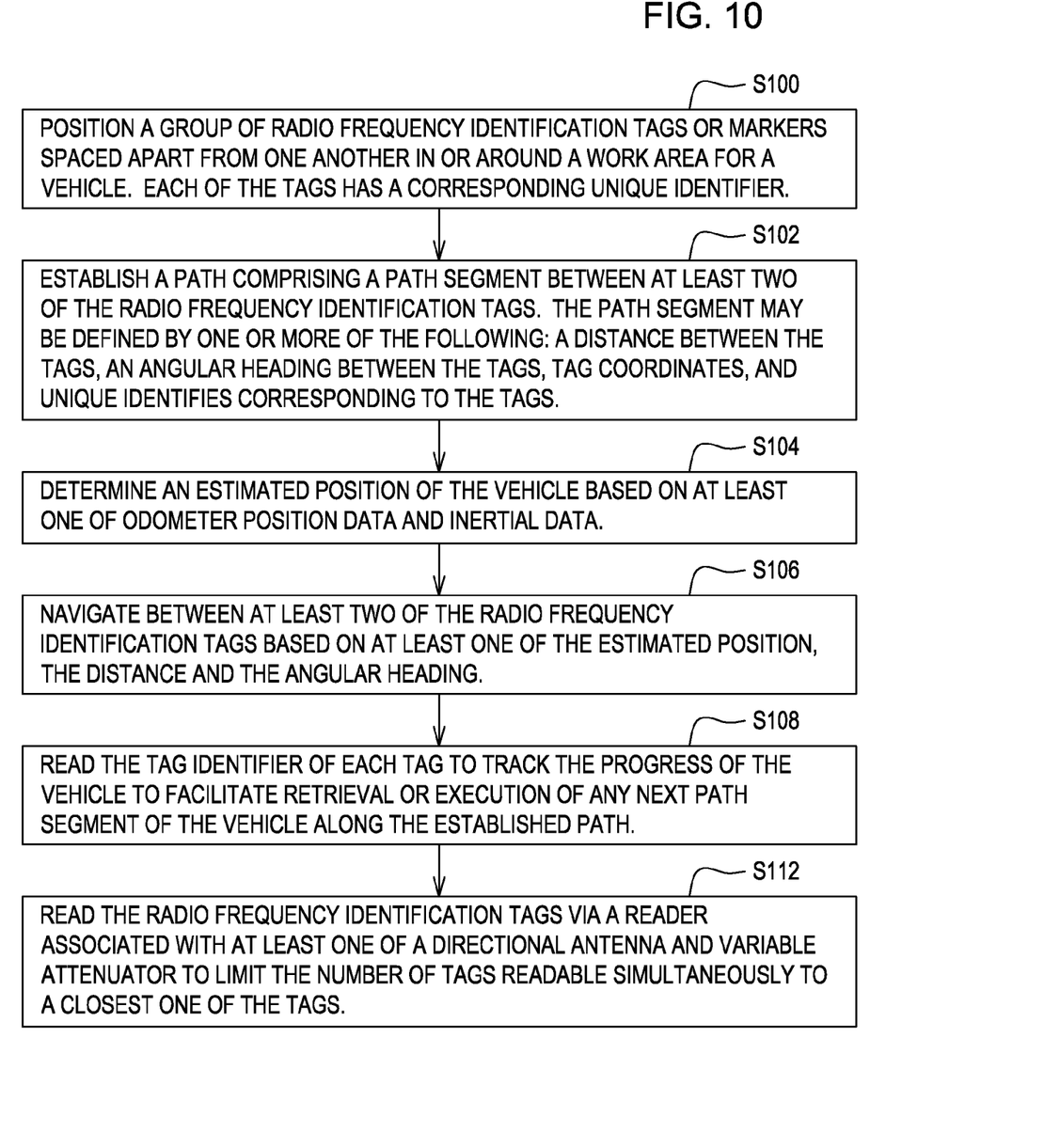
FIG. 10 is a flow chart of a third embodiment of a method for determining a position of the vehicle.

The method of FIG. 10 is similar to the method of FIG. 8, except the method of FIG. 10 further comprises step S112. Like reference numbers in FIG. 10 and FIG. 8 indicate like steps or procedures.

In step S112, the reader 12 reads the radio frequency identification tag, where the reader 12 is associated with at least one of a directional antenna 30, an amplifier 32 (e.g., with variable gain or attenuation), or an attenuator to limit the number of tags readable simultaneously to a closest one of the tags. The position system 111 of FIG. 2 comprises a directional antenna 32 and an amplifier 32 for limiting or reducing the number of tags readable to reduce potential ambiguities in the location or position of the vehicle, where more than one tag is received by the reader 12.

Step S112 may be executed by various techniques that may be applied separately or cumulatively. Under a first technique, the directional antenna 30 may be directed toward a front direction of the vehicle, where the radiation pattern of the directional antenna 30 has a highest gain within a target angular range (e.g., thirty, sixty or ninety degrees between the half power points of the peak radiation pattern gain). The gain in the back and sides of the antenna is substantially less than the peak gain of the radiation pattern directed in a front direction of the vehicle. Accordingly, signals from tags on the back and sides of the vehicle are filtered out, reducing the ambiguity of the estimated position of the vehicle, which can be based on a closest tag (e.g., or a limited number of tags) in front of the vehicle.

Under a second technique for executing step S112, the directional antenna 30 may be directed toward a front direction of the vehicle, where the radiation pattern of the directional antenna 30 has a highest gain within a target angular range (e.g., thirty, sixty or ninety degrees between the half power points of the peak radiation pattern gain) and the amplifier gain of the amplifier 32 may be reduced (or an attenuation of an attenuator increased) to focus on a closest tag associated with the work area (e.g., a closest tag in front of the vehicle if the radiation pattern (e.g., peak gain) of the direction antenna 30 faces frontward). The gain in the back and sides of the antenna is substantially less than the peak gain of the radiation pattern directed in a front direction of the vehicle. Accordingly, signals from tags on the back and sides of the vehicle are filtered out, reducing the ambiguity of the estimated position of the vehicle, which can be based on a closest tag (e.g., or a limited number of tags) in front of the vehicle. Further, the position estimator 19, data processor 20 or reader 12 may provide a signal or data message for the amplifier gain of the amplifier 32 to be reduced such that reader 12 only receives a single signal from a tag that is generally the closest to the vehicle.

Figure 11:
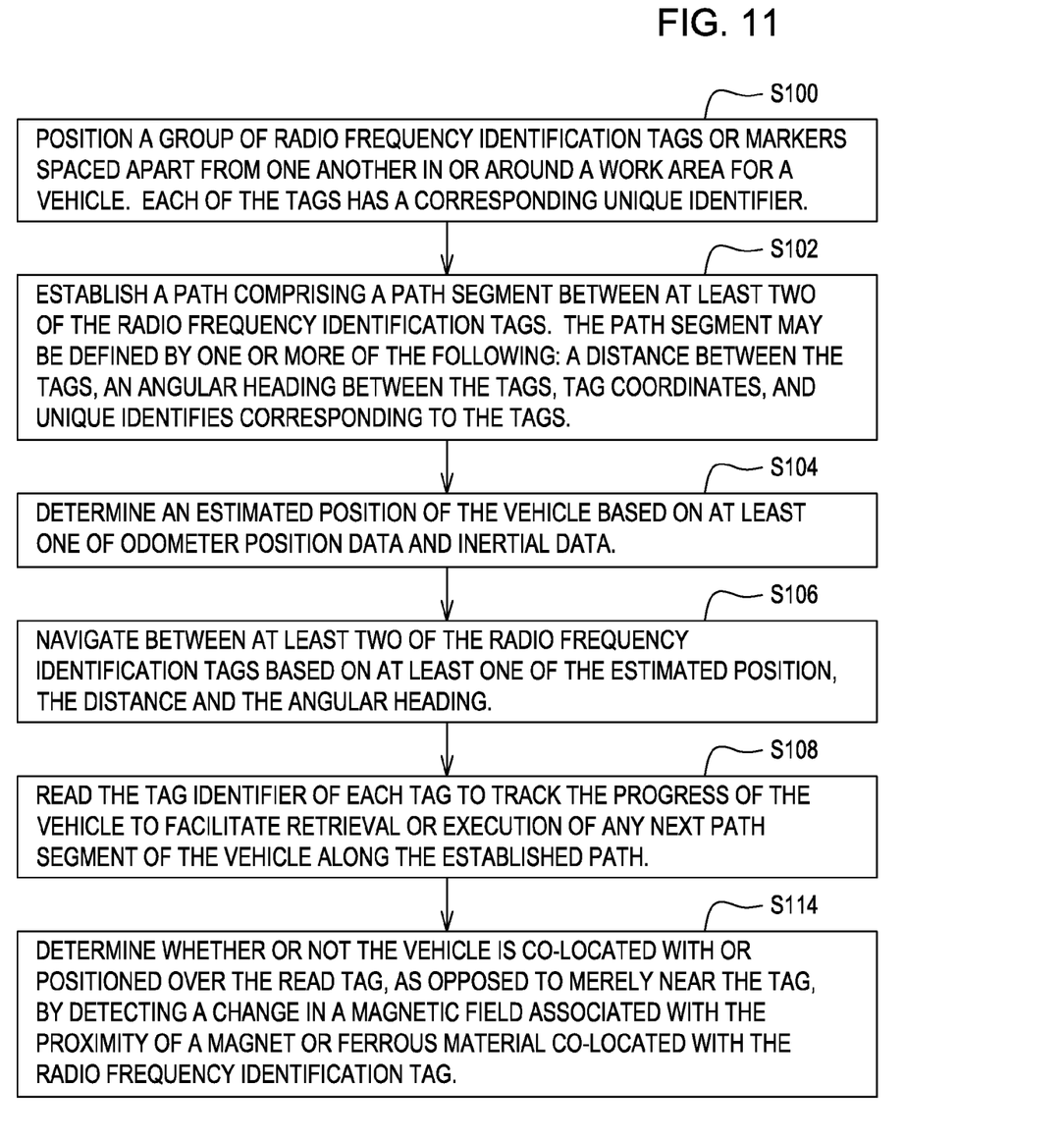
FIG. 11 is a flow chart of a fourth embodiment of a method for determining a position of the vehicle.

The method of FIG. 11 is similar to the method of FIG. 8. The method of FIG. 11 comprises step S114. Like reference numbers in FIG. 8 and FIG. 11 indicate like steps or procedures.

In step S114, the data processor 20 or position verification module 23 determines whether or not the vehicle is co-located with or positioned over the read tag, as opposed to merely near the tag, by detecting a change in magnetic field associated with the proximity of a magnet (e.g., permanent magnet or electromagnet) or ferrous material co-located with the radio frequency identification tag. For example, a metal detector 26 or ferrous metal detection circuit detects the change in magnetic field associated with the proximity of a magnet or ferrous material and provides a detection signal or detection data to the data processor 20 or position verification module 23. The metal detector 26 of the position system 311 of FIG. 4 facilitates eliminating or reducing potential ambiguities in the estimated position of the vehicle, where the reader 12 receives simultaneous signals from multiple radio frequency identification tags or markers 506, and the position estimator 19 cannot determine which tag is closest to the vehicle (e.g., by looking at a previously received, verified identifier of a radio frequency identification tag that the vehicle recently passed.)

Figure 12:
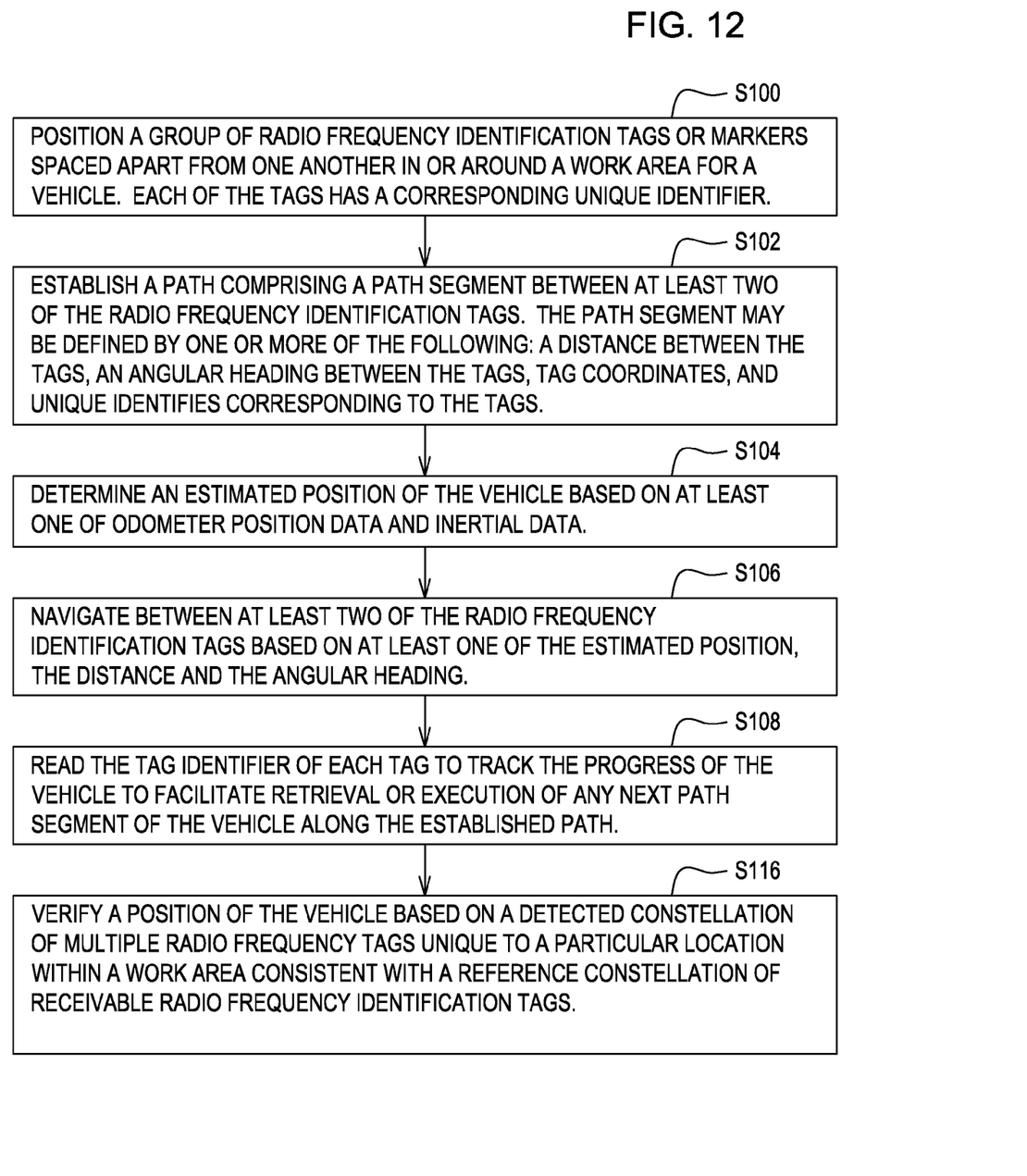
FIG. 12 is a flow chart of a fifth embodiment of a method for determining a position of the vehicle.

The method of FIG. 12 is similar to the method of FIG. 8. The method of FIG. 12 comprises step S116. Like reference numbers in FIG. 8 and FIG. 12 indicate like steps or procedures.

In step S116, the data processor 20 or position verification module 23 verifies a position of the vehicle (e.g., 55) based on a detected constellation of multiple radio frequency tags unique (e.g., within a grid 508 of FIG. 6 or around a perimeter 502 of work area 500) to a particular location within a work area consistent with a reference constellation of receivable radio frequency identification tags. For example, the detected constellation of multiple radio frequency tags may be unique to a particular location within the work area consistent with a reference constellation of receivable radio frequency identification tags. The reader 12 may receive signals simultaneously from a detected constellation of multiple radio frequency tags, where an omnidirectional antenna 34 is coupled to the reader 12 as in the positioning system 211 of FIG. 3.

Step S116 may be carried out as follows. The position verification module 23 or data processor 120 receives the detected constellation of multiple tag identifiers from the reader 12 when the vehicle is operating within the work area. The position verification module 23 compares the received tag identifiers to a reference constellation of reference tag identifiers associated with corresponding known locations in the work area. The constellation of reference tag identifiers may comprise a group of tag identifiers or a group of tag identifiers with known relative orientations or positions (e.g., two or three dimensional coordinates or relative coordinates) with respect to each other. The constellation of reference tag identifiers may be established by surveying the work area and then stored in a data storage device 15 for later access by the data processor (20 or 120), for example. The position verification module 23 may determine the exact location or zone of the vehicle, if the detected constellation matches the reference constellation and there is only one unique location or unique zone associated with the reference constellation. The position verification module 23 also supports narrowing down the possible location of the vehicle to one or more candidate locations or candidate zones based on a match between the detected constellations and the reference constellation and the last known position of the vehicle and its heading. Further, in one illustrative example, a candidate location can be verified as the actual location of the vehicle by the data processor 20 applying odometer data, inertial sensor data, or both.

Having described the preferred embodiment, it will become apparent that various modifications can be made without departing from the scope of the invention as defined in the accompanying claims.

The following is claimed:

1. A method for determining the position of a vehicle, the method comprising the steps of:
    positioning a group of radio frequency identification tags spaced apart from one another in or around a work area for the vehicle, each of the tags having a corresponding unique identifier;
    establishing a path comprising a path segment between at least two of the radio frequency identification tags, the path segment comprising at least one of a distance between the tags, an angular heading between the tags, coordinates of the tags, and unique identifiers corresponding to the tags;
    determining an estimated position of the vehicle based on at least one of odometer data and inertial data;
    navigating between at least two of the radio frequency identification tags based on the estimated position, the distance and the angular heading;
    reading the tag identifiers of each tag to track the progress of the vehicle to facilitate execution of or retrieval of any next path segment of the vehicle along the established path;
    providing a ferrous metal member for collocation with each radio frequency identification tag; and
    using a ferrous metal detection circuit to detect or confirm the near proximity of the radio frequency identification tag.

2. The method according to claim 1 further comprising:
    determining whether or not the vehicle is co-located with or positioned over the read tag, as opposed to merely near the tag, by detecting a change in a magnetic field associated with the proximity of a magnet or ferrous material co-located with the radio frequency identification tag.

3. The method according to claim 1 further comprising:
    positioning the group of radio frequency identification tags on or near a boundary or outer perimeter of a work area.

4. The method according to claim 1 wherein the positioning comprises positioning the radio frequency identification tags an offset distance inward from an outer boundary of a work area, where the offset distance is based on a mowing swath width of the vehicle and a position of an antenna, for receiving radio frequency identification tag signals, overlying the radio frequency tags in the work area.

5. The method according to claim 1 further comprising:
    positioning the group of radio frequency identification tags into a grid associated with the work area.

6. The method according to claim 5 further comprising:
    assigning a path through the grid based upon an interconnected series of path segments between any two radio frequency identification tags.

7. The method according to claim 1 wherein the path comprises a virtual track for the vehicle in the work area, and wherein the vehicle is prohibited from leaving the virtual track and entering other areas of the work area.

8. The method according to claim 1 further comprising:
    reading the radio frequency identification tags via a reader coupled to at least one of a directional antenna, an amplifier with adjustable gain, and an attenuator to limit the number of tags readable simultaneously to a closest tag of the tags associated with the work area.

9. The method according to claim 1 further comprising:
    verifying a position of the vehicle based on a detected constellation of multiple radio frequency tags unique to a particular location within a work area consistent with a reference constellation of receivable radio frequency identification tags.

10. The method according to claim 1 further comprising:
    reading multiple radio frequency identification tags via a reader that is coupled to an omni-directional antenna.

11. The method according to claim 1 further comprising:
    establishing a path plan for the vehicle based on series of path segments between any two of the radio frequency tags.

12. A system for determining the position of a vehicle, the system comprising:
    a group of radio frequency identification tags spaced apart from one another in or around a work area for the vehicle, each of the tags having a corresponding unique identifier;
    a path planning module for establishing a path comprising a path segment between at least two of the radio frequency identification tags, the path segment comprising a least one of a distance between the tags, an angular heading between the tags, tag coordinates, and unique identifiers corresponding to the tags;
    a position estimator for determining an estimated position of the vehicle based on at least one of odometer data and inertial data;
    a vehicle controller for navigating between at least two of the radio frequency identification tags based on the estimated position, the distance and the angular heading;
    a reader for reading the tag identifiers of each tag to track the progress to facilitate execution of retrieval of any next path segment of the vehicle along the established path;
    a metal detector for detecting a change in a magnetic field associated with the proximity of a magnet or ferrous material co-located with the radio frequency identification tag; and
    a position verification module for determining whether or not the vehicle is co-located with or positioned over the read tag, as opposed to merely near the tag.

13. The system according to 12 wherein the established path comprises an interconnected series of path segments between any two radio frequency identification tags.

14. The system according to claim 12 wherein the reader further comprises at least one of directional antenna, an amplifier with variable gain and an attenuator to limit the number of tags readable simultaneously to a closest tag of the tags in the work area.

15. The system according to claim 12 further comprising:
    a position verification module for verifying a position of the vehicle based on a detected constellation of multiple radio frequency tags unique to a particular location within a work area consistent with a reference constellation of receivable radio frequency identification tags.

16. The system according to claim 12 wherein the reader is coupled to an omni-directional antenna for receiving signals from radio frequency tags within a detectable constellation.

* * * * *